United States Patent [19]

Berry et al.

[11] Patent Number: 4,477,425
[45] Date of Patent: Oct. 16, 1984

[54] PRODUCTION OF ANHYDROUS HYDROGEN FLUORIDE FROM LOW-GRADE METALLIC FLUORIDES AND SULFURIC ACID

[75] Inventors: William W. Berry, Winter Haven; Robert A. Ashworth, Tampa; Ned B. Spake, Winter Park, all of Fla.

[73] Assignee: Florida Progress Corporation, St. Petersburg, Fla.

[21] Appl. No.: 561,788

[22] Filed: Dec. 15, 1983

[51] Int. Cl.³ .............................................. C01B 7/19
[52] U.S. Cl. .................................... 423/485; 423/483; 423/484; 423/551; 423/554; 423/555; 423/556
[58] Field of Search ............... 423/485, 483, 484, 551, 423/554, 555, 556, 126, 163, 185

[56] References Cited

U.S. PATENT DOCUMENTS 3,029,134  4/1962  Cardon ................................. 423/485
3,996,340 12/1976  Steineke ............................... 423/489
4,298,586 11/1981  Sikdar .................................. 423/339
4,399,113  8/1983  Tosaka et al. ........................ 423/240

FOREIGN PATENT DOCUMENTS 882930 11/1981  U.S.S.R. ............................... 423/163

Primary Examiner—G. L. Kaplan
Attorney, Agent, or Firm—Russell, Georges, Breneman, Hellwege & Yee

[57] ABSTRACT

A novel method is provided for the production of anhydrous hydrofluoric acid from low-grade metallic fluorides using an intermediate aluminum fluoride compound. The method involves the reaction of low-grade metallic fluorides such as fluorspar with sulfuric acid to produce weak hydrofluoric acid. The weak acid is then reacted with a metallic salt (such as aluminum chloride) to form precipitated aluminum fluoride ($AlF_3 \cdot 3H_2O$). After dewatering, the aluminum fluoride is reacted with strong sulfuric acid to form aluminum sulfate and strong hydrofluoric acid.

13 Claims, 1 Drawing Figure

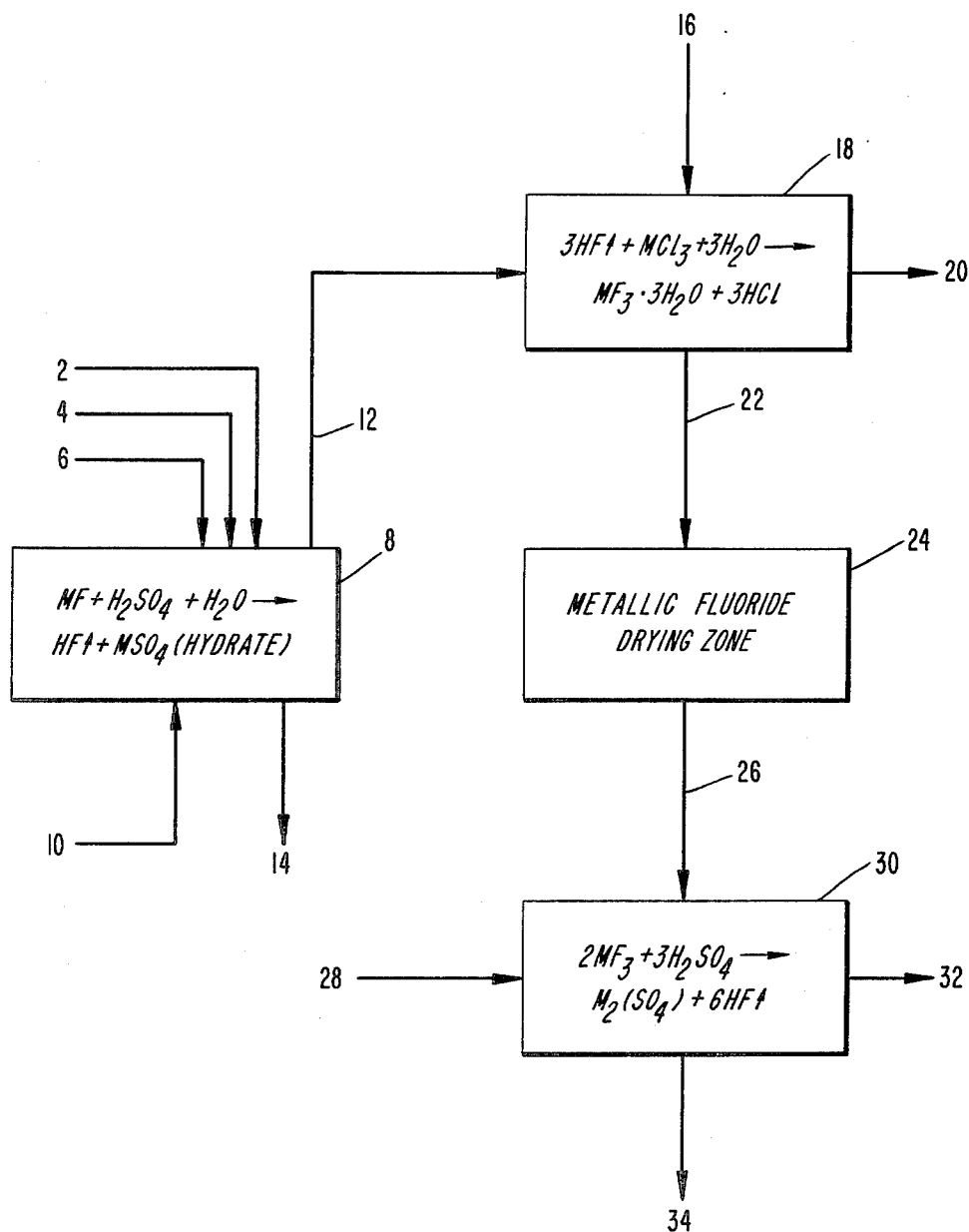

PRODUCTION OF ANHYDROUS HYDROGEN FLUORIDE FROM LOW-GRADE METALLIC FLUORIDES AND SULFURIC ACID

BACKGROUND OF THE PRESENT INVENTION

The present invention is directed to the production of anhydrous hydrofluoric acid.

Commercial grade hydrofluoric acid is generally prepared by the reaction of acid-grade (high purity) fluorspar with strong sulfuric acid, and sometimes oleum, in a specially designed reactor. To produce anhydrous hydrofluoric acid, the fluorspar must first be dried completely. Hot, dry gas is sparged through the reaction mass during the reaction to maintain the temperature and drive off the hydrogen fluoride. The hydrogen fluoride gas is then condensed or scrubbed. The calcium sulfate remaining in the reactor contains excess sulfuric acid, which must be neutralized before disposal.

U.S. Pat. Nos. 1,316,569; 2,088,048; 2,846,290; 2,932,557; 3,102,787; 3,160,473; 3,300,279; 3,469,939; 3,718,736; 3,725,536; 3,825,655; 3,878,294; 4,010,245; and 4,120,939 each disclose processes for the production of hydrofluoric acid by the reaction of fluorspar and sulfuric acid. U.S. Pat. No. 4,268,492 discloses a process for the production of an alkali metal sulfate and hydrofluoric acid from sulfuric acid and an alkali metal fluosilicate, with the patent also disclosing that hydrogen fluoride and $SiF_4(H_2SiF_6)$ may be reacted with an alkali metal chloride to produce hydrochloric acid and an alkali metal fluosilicate.

It would, however, be desirable to provide an economical process for the production of anhydrous hydrofluoric acid by use of low grade sources of fluorine which process avoids the need for time-consuming and expensive treatment of the fluorine-containing raw material.

OBJECTS AND SUMMARY OF THE INVENTION

It is accordingly an object of the present invention to provide a process for the production of anhydrous hydrofluoric acid by use of a metallic fluoride intermediate.

It is also an object of the present invention to provide a process for the production of anhydrous hydrofluoric acid from low-grade sources of fluoride.

It is also an object of the present invention to provide a process for the production of a metallic sulfate such as aluminum sulfate.

In accordance with the present invention, there is thus provided a process for the production of anhydrous hydrofluoric acid from low-grade sources of fluorine comprising:

(a) reacting a low grade source of fluorine comprised of a metallic fluoride with sulfuric acid in a reaction zone at a temperature ranging from about 140° to about 220° C. to yield hydrogen fluoride and a metallic sulfate;

(b) recovering said hydrogen fluoride formed in step (a);

(c) reacting said recovered hydrogen fluoride with a metallic salt of a metal in the form of an aqueous solution thereof which metal forms slightly soluble or insoluble fluorides at a temperature ranging from about ambient to about 120° C. to produce a hydrated metallic fluoride and a corresponding acid;

(d) recovering said hydrated metallic fluoride from step (c) as a precipitate and heating said metallic fluoride to a temperature sufficient to remove bound water;

(e) reacting said dehydrated metallic fluoride from step (d) with sulfuric acid at a temperature ranging from about 70° to about 120° C. to produce anhydrous hydrofluoric acid and a metallic sulfate; and (f) recovering said anhydrous hydrofluoric acid.

BRIEF DESCRIPTION OF THE DRAWING

The Figure depicts schematically the process of the present invention.

DETAILED DESCRIPTION OF THE INVENTION

It has been surprisingly and unexpectedly discovered that anhydrous hydrofluoric acid and a metallic salt such as aluminum sulfate can be produced from solid low grade sources of fluorine and aluminum. Exemplary of a solid low grade (i.e., impurity-containing) source of fluorine which may be employed in the process of the present invention comprised of a metallic fluoride includes low grade fluorspar ($CaF_2$) which contains a significant degree of impurities such as carbonates, phosphates, etc.

The process of the present invention may be practiced as described below and will be discussed in conjunction with the Figure. A low grade source of fluorine comprised of a metallic fluoride such as waste fluorspar 2 is contacted with sulfuric acid (>90 wt. %) 4 and water 6 in a reaction zone 8 (e.g., a fluidized bed or stirred tank reactor) to produce hydrofluoric acid and hydrated calcium sulfate as follows:

General: $MF + H_2SO_4 + H_2O \rightarrow HF\uparrow + MSO_4$ (hydrate)     (1)

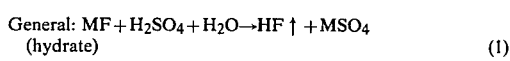

Specific: $CaF_2 + H_2SO_4 + 2H_2O \rightarrow 2HF\uparrow + CaSO_4 \cdot 2H_2O$     (1A)

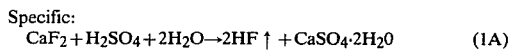

A temperature ranging from about 140° to about 220° C. and a pressure near atmospheric are generally employed in the reaction zone 8. The sulfuric acid is present in amounts sufficient to provide a free acid concentration of from about 2 to 10 weight percent in the reaction zone.

Steam or other inert gas 10, preferably heated, is sparged through the reaction zone 8 to recover hydrogen fluoride gas which is formed as a result of the reaction (1) or (1A). Reduced pressure in the reaction zone may also be employed to recover the hydrogen fluoride gas. Any non-reactive, volatile impurities which enter the reaction zone with the source of fluorine (e.g., carbonates or phosphates, etc.) remain in the liquid phase and are recovered with the remaining hydrated calcium sulfate (gypsum) by-product 14. Another source of low grade metallic fluorides would include by-product sodium fluoride produced from certain phosphoric acid processes.

The hydrogen fluoride gas 12 is then recovered (e.g., condensed) and contacted with an aqueous solution of a metallic salt 16 in reaction zone 18, as follows, to yield a metallic fluoride precipitate:

$3HF\uparrow + MCl_3 + 3H_2O \rightarrow MF_3 \cdot 3H_2O + 3HCl$     (2)

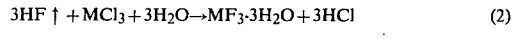

wherein M is a metal which forms slightly soluble or insoluble fluorides whereby the metallic fluoride may be recovered as a precipitate such as aluminum, magnesium, sodium, etc. and is preferably aluminum.

Suitable metallic salts include but are not limited to chlorides, sulfates and nitrates. The metallic salt may be derived from a low grade source thereof which contains substantial impurities. For example, low grade aluminum chloride may be obtained by the treatment of fly ash with hydrochloric acid (e.g., acid extraction). Corresponding acids may be employed to produce aluminum nitrate or sulfate. The reaction (2) is carried out at a temperature ranging from about ambient to about 120° C. and at a pressure near atmospheric. Any acid 20 which is produced such as hydrochloric, nitric or sulfuric acid may be recovered for use elsewhere.

The thus-formed metallic fluoride in the form of a precipitate 22 is recovered by filtration (not shown) and dried at a temperature ranging from about 105° to 150° C. in drying zone 24. The dewatered metallic fluoride 26 is subsequently reacted with strong (>90 wt. %) sulfuric acid 28 in reaction zone 30 at a temperature ranging from about 70° to about 120° C. and a pressure near atmospheric as follows:

$$2MF_3 + 3H_2SO_4 \rightarrow M_2(SO_4) + 6HF \uparrow \quad (3)$$

During the reaction (3) the metallic sulfate and the sulfuric acid act as dehydrating agents, resulting in the production of a dry hydrogen fluoride gas. The hydrogen fluoride gas may then be recovered and condensed to yield an anhydrous grade hydrofluoric acid product 32.

If, in the alternative, the metallic fluoride is not dried to remove bound water prior to reaction with the sulfuric acid, a 70 weight percent commercial grade hydrofluoric acid product may be produced. In either event, a commercial grade metallic sulfate by-product 34 is produced which may be employed in either a crystalline form or in a solution form.

The process of the present invention enables many advantages to be realized. Low grade sources of fluorine may be employed which avoid the need for more expensive materials of greater purity such as acid-grade fluorspar. A fluid bed or stirred tank reactor may be employed in the process of the present invention which may accomodate a wet fluorspar feed containing high levels of impurities. The impurities remain in the reactor subsequent to recovery of the hydrofluoric acid. Similarly, a low grade source of aluminum may be employed such as fly ash which is readily available at a lesser cost than an alternative source such as bauxite ore. As a result of the type of reactions employed, anhydrous hydrofluoric acid and metallic sulfates may be produced with minimal dewatering requirements Additionally, aluminum sulfate is generally prepared by the reaction of bauxite ore (crude hydrated alumina) with strong sulfuric acid at boiling temperatures with the process requiring several hours of vigorous boiling. The process of the present invention permits metallic sulfates such as aluminum sulfate to be prepared much more efficiently and at lower temperatures than generally employed previously.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:
1. A process for the production of anhydrous hydrofluoric acid from low-grade sources of fluorine comprising:
   (a) reacting a low grade source of fluorine comprised of a metallic fluoride with sulfuric acid in a reaction zone at a temperature ranging from about 140° to 220° C. to produce hydrogen fluoride and hydrated metallic sulfate;
   (b) recovering said hydrogen fluoride formed in step (a);
   (c) reacting said recovered hydrogen fluoride with a metallic salt of a metal in the form of an aqueous solution thereof which metal forms slightly soluble or insoluble fluorides at a temperature ranging from about ambient to about 120° C. to produce a hydrated metallic fluoride and a corresponding acid;
   (d) recovering said hydrated metallic fluoride from step (c) as a precipitate and heating said metallic fluoride to a temperature sufficient to remove bound water;
   (e) reacting said dehydrated metallic fluoride from step (d) with sulfuric acid at a temperature ranging from about 70° to about 120° C. to produce anhydrous hydrofluoric acid and a metallic sulfate; and
   (f) recovering said anhydrous hydrofluoric acid.
2. The process of claim 1 wherein said low grade source of fluorine comprises fluorspar.
3. The process of claim 1 wherein said hydrogen fluoride is recovered in step (b) by stripping.
4. The process of claim 3 wherein said stripping occurs by the use of steam sparged through said reaction zone.
5. The process of claim 1 wherein said metallic salt is selected from the group consisting of chlorides, sulfates and nitrates.
6. The process of claim 5 wherein said metallic salt is selected from the group consisting of magnesium chloride, magnesium sulfate and magnesium nitrate.
7. The process of claim 5 wherein said metallic salt is selected from the group consisting of sodium chloride, sodium sulfate and sodium nitrate.
8. The process of claim 5 wherein said metallic salt is selected from the group consisting of aluminum chloride, aluminum sulfate and aluminum nitrate.
9. The process of claim 1 wherein said metallic salt comprises aluminum chloride.
10. The process of claim 1 wherein said metallic fluoride in step (d) is heated to a temperature in the range of about 105° to 150° C.
11. The process of claim 1 wherein said metallic fluoride is recovered in step (d) by filtration.
12. The process of claim 1 wherein said metallic salt is an aluminum salt produced by the acid extraction of fly ash with an acid.
13. The process of claim 12 wherein said acid is selected from the group consisting of hydrochloric acid, sulfuric acid and nitric acid.

* * * * *